United States Patent
Yuanzhu et al.

(10) Patent No.: US 6,727,779 B2
(45) Date of Patent: Apr. 27, 2004

(54) CONVERTER FOR SATELLITE COMMUNICATION RECEPTION HAVING BRANCHING WAVEGUIDE WITH L-SHAPE PROBES

(75) Inventors: Dou Yuanzhu, Fukushma-ken (JP); Toshiaki Konno, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/038,227

(22) Filed: Oct. 29, 2001

(65) Prior Publication Data

US 2002/0067221 A1 Jun. 6, 2002

(30) Foreign Application Priority Data

Oct. 30, 2000 (JP) ........................................ 2000-331031

(51) Int. Cl.7 ............................................... H01P 1/161
(52) U.S. Cl. ...................... 333/125; 333/137; 333/21 A
(58) Field of Search ................................ 333/21 A, 137, 333/125

(56) References Cited

U.S. PATENT DOCUMENTS 6,426,729 B2 * 7/2002 Yoshida et al. ....... 333/21 A X
6,445,260 B1 * 9/2002 Miyazaki .................. 333/21 A

FOREIGN PATENT DOCUMENTS

| JP | 09-036618 | 2/1997 |
| JP | 10-261902 | 9/1998 |

* cited by examiner

*Primary Examiner*—Benny Lee
(74) *Attorney, Agent, or Firm*—Brinks Hofer Gilson & Lione

(57) ABSTRACT

A converter for satellite communication reception which reduces signal losses and has a simplified assembling work is disclosed. In operation, orthogonal bipolarized signals transmitted from a satellite are branched into two propagation paths within a waveguide. A horizontally polarized wave is caused to proceed in a first propagation path, while a vertically polarized wave is caused to proceed in a second propagation path. A pair of probes supported by a circuit substrate and fitted to a case have tips that extend into two waveguides to receive the respective signals. By integrating the waveguide and the case by fastening, the first propagation path and the first waveguide are positioned to communicate with each other, as are the second propagation path and the second waveguide.

4 Claims, 3 Drawing Sheets

CONVERTER FOR SATELLITE COMMUNICATION RECEPTION HAVING BRANCHING WAVEGUIDE WITH L-SHAPE PROBES

BACKGROUND OF THE INVENTION

1. Field of the Invention

The present invention relates to a converter for satellite communication reception for receiving mutually orthogonal linear polarized waves, and more particularly to the structure of the input parts of waveguides.

2. Description of the Related Art

Usually, where linear polarized waves of up to about 12 GHz in the frequency range of input signals are to be received by a converter for satellite communication reception of this kind, a pair of probes are arranged in mutually orthogonal directions within a waveguide, and a vertically polarized wave is coupled to one of the probes while a horizontally polarized wave is coupled to the other probe.

However, where the frequency range of input signals is as high as 20 GHz for instance, the problem of interference between the vertically polarized wave and the horizontally polarized wave becomes significant in the constitution described above. Therefore, where linear polarized waves of an extremely high frequency range are to be received, the inside of the waveguide is branched into two paths, one for the vertically polarized wave and the other for the horizontally polarized wave, and polarized signals detected by probes are prevented from interfering with each other by coupling the vertically polarized wave and the horizontally polarized wave to the probes in their respective propagation paths.

However, where the vertically polarized wave and the horizontally polarized wave are to be coupled to probes in two separate propagation paths as according to the prior art described above, usually each one of the two probes is fitted to a separate circuit substrate, one circuit substrate being provided with a signal synthesizing means, and signals are transmitted from the other circuit substrate to the circuit substrate provided with the synthesizing means via a connecting section, because the electric field directions of the vertically polarized wave component and the horizontally polarized wave component are orthogonal to each other in the propagation paths. However, synthesis of signals detected by two probes using two circuit substrates not only makes the pattern and structure more complex but also involves the problems of increased signal losses and it is impossible to reduce the interference sufficiently and, moreover, complicates the circuit substrate ability to work on account of the high frequency of the polarized signals.

There is also proposed an alternative according to which both probes are fitted to the same circuit substrate and an adapter is provided in between this circuit substrate and the waveguide, which aligns the electric field directions of the vertically polarized wave component and the horizontally polarized wave component into the same direction, but such an adapter would complicate the structure and accordingly this adapter would boost the cost of the structure.

SUMMARY OF THE INVENTION

In view of the problems involved in the prior art, the present invention provides a simply structured converter for satellite communication reception which can contribute to reducing signal losses and simplifying the assembly work.

In order to achieve the above-stated object, a converter for satellite communication reception according to the invention is provided with a case having two waveguides in which linear polarized waves orthogonal to each other propagate, a circuit substrate fitted to this case and two probes disposed on this circuit substrate, wherein these two probes are arranged in the waveguides.

This configuration, as the mutually orthogonal linear polarized waves are coupled to their respective probes in the two waveguides of the case and signals detected by these probes can be amplified and synthesized on the same circuit substrate, not only can signal losses and interference be reduced but also the structure of the input parts of the waveguides can be simplified.

If, in the configuration described above, the two probes are composed of pin members and these pin members are supported by the circuit substrate by soldering or otherwise, the mutually orthogonal linear polarized waves can be securely coupled to the pin members within the respective waveguides. In this case, if both pin members are formed in an L shape and a ground pattern provided on the circuit substrate is utilized as a reflective face for these pin members, the structure can be simplified even more.

Or, in the configuration described above, it is also possible to compose the two probes of electroconductive patterns provided on the circuit substrate and fit a short cap as a reflective face for these electroconductive patterns to the circuit substrate, and in this way it is also possible to securely couple the mutually orthogonal linear polarized waves to the electroconductive patterns within the respective waveguides.

DETAILED DESCRIPTION OF THE PREFERRED EMBODIMENTS

Figure 1:
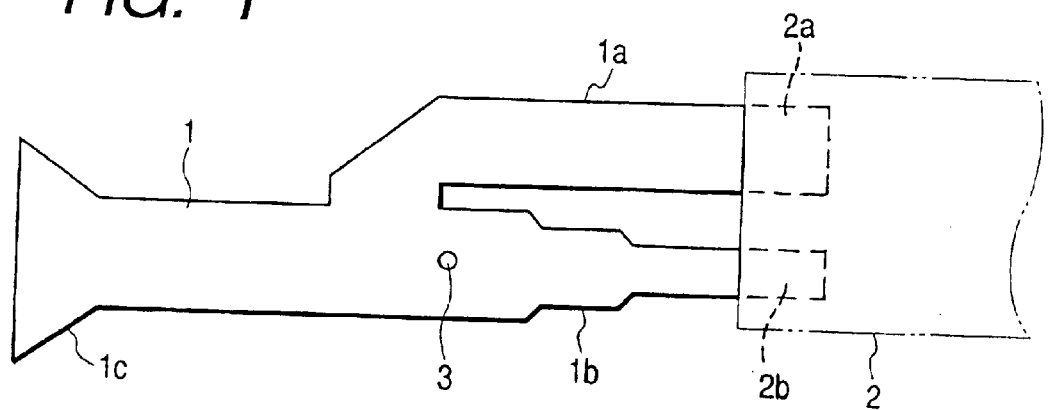
FIG. 1 shows the overall configuration of a converter for satellite communication reception, which is a first preferred embodiment of the present invention.
Figure 2:
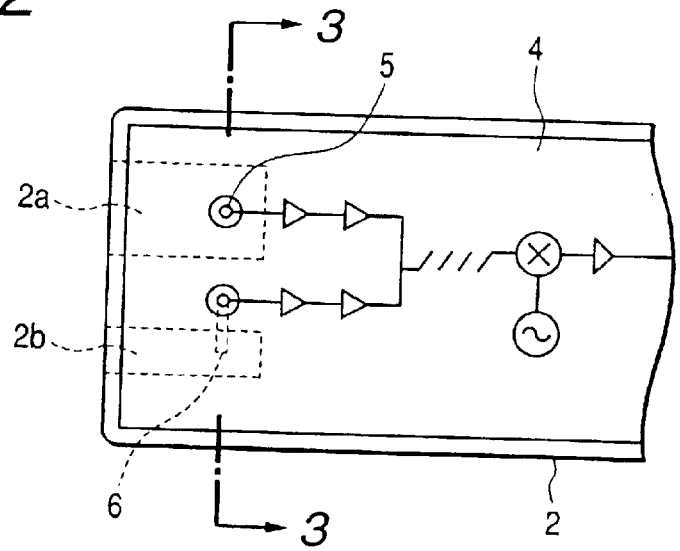
FIG. 2 shows a plan view of the essential part of a case provided in the converter for satellite communication reception.

Preferred embodiments of the present invention will be described below with references to accompanying drawings. FIG. 1 shows the overall configuration of a converter for satellite communication reception, which is the first preferred embodiment of the invention; FIG. 2, a plan view of the essential part of a case provided in the converter for satellite communication reception, and FIG. 3, a section view along line 3—3 in FIG. 2.

As illustrated in FIG. 1, the converter for satellite communication reception embodying the invention in this mode is provided with a wave guide 1 whose inside is branched into two propagation paths 1a and 1b and a case 2 consisting of an electroconductive metallic material. Orthogonal bipolarized signals transmitted from a satellite are entered into the inside of the waveguide 1 through a horn 1c. The waveguide 1 includes a short-circuit rod 3, which receives the orthogonal bipolarized signals. When the short-circuit rod 3 receives these orthogonal bipolarized signals, a horizontally polarized wave in the orthogonal bipolarized signals, for instance, is reflected by the short-circuit rod 3 to proceed in the first propagation path 1a. In other instance, a vertically polarized wave in the orthogonal bipolarized signals passes the short-circuit rod 3 to proceed in the second propagation path 1b.

Figure 3:
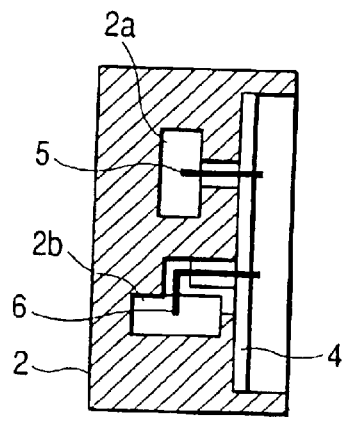
FIG. 3 shows a section view along line 3—3 in FIG. 2.

As shown in FIG. 2 and FIG. 3, a circuit substrate 4 is fitted to the case 2, and a pair of probes 5 and 6 are coupled to the circuit substrate 4 by solder or other suitable joints.

A converter circuit (not shown) includes an amplifier, an oscillator and the like coupled to the circuit substrate 4. The first probe 5 is a straight pin member while the second probe 6 is preferably an L-shaped pin member; preferably, the tips of the probes 5 and 6 extend into two waveguides 2a and 2b positioned in the case 2. By integrating the waveguide 1 with the case 2 by fasteners or fixing means such as bolts, the first propagation path 1a and the first waveguide 2a can communicate with each other just as the second propagation path 1b and the second waveguide 2b can communication with each other. In this preferred configuration, the tip of the first probe 5 extends in a direction parallel to the polarization plane of the horizontally polarized wave, and that of the second probe 6 extends in a direction parallel to the polarization plane of the vertically polarized wave.

In the preferred converter for satellite communication, when orthogonal bipolarized signals transmitted from a satellite are received within the waveguide 1 through the horn 1c, the horizontally polarized wave is reflected by the short-circuit rod 3 toward the first propagation path 1a to the first waveguide 2a, and reflected by an innermost wall of the first waveguide 2a to be detected by the first probe 5. On the other hand, the vertically polarized wave passes the short-circuit rod 3 to proceed from the second propagation path 1b to the second waveguide 2b, and is reflected by an innermost wall of the second waveguide 2b to be detected by the second probe 6. The horizontally polarized signals detected by the first probe 5 and the vertically polarized signals detected by the second probe 6, after undergoing frequency conversion into IF signals by the converter circuit on the circuit substrate 4, are outputted via output terminals (not shown) provided on the case 2. Therefore, the orthogonal bipolarized waves, comprising the horizontally polarized wave and the vertically polarized wave, are coupled in the waveguides 2a and 2b of the case 2 to their respective probes 5 and 6. Preferably, the signals detected by probes 5 and 6 can be amplified and synthesized on the same circuit substrate 4, which significantly reduces signal losses and interference and simplifies the input structure of the waveguides.

Figure 4:
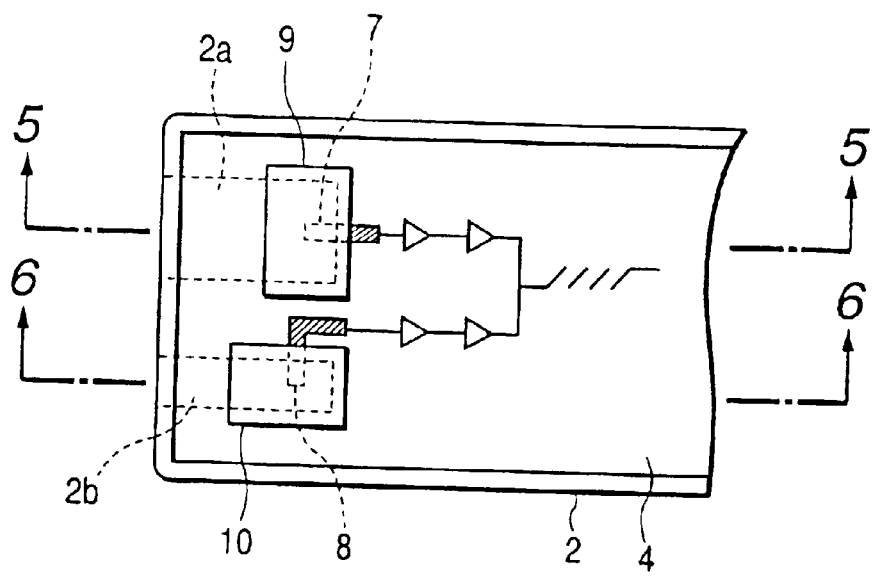
FIG. 4 shows a plain view of the essential part of a case provided in a second preferred embodiment of the invention.
Figure 5:
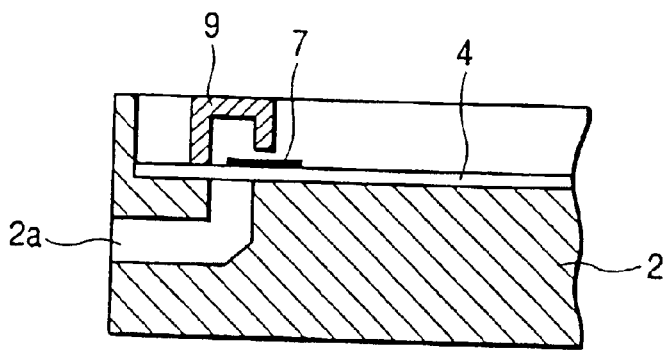
FIG. 5 shows a section view along line 5—5 in FIG. 4.
Figure 6:
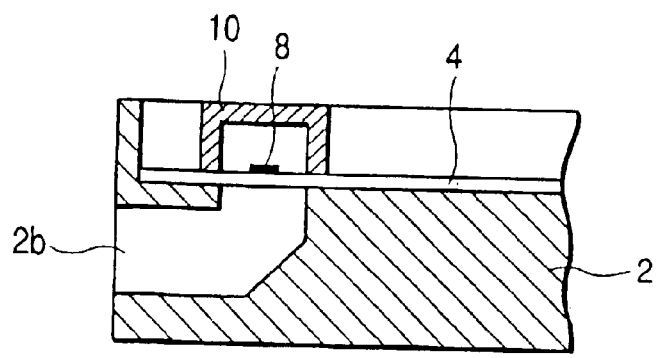
FIG. 6 shows a section view along line 6—6 in FIG. 4.

FIG. 4 shows a plan view of a preferred case provided in a second preferred embodiment; FIG. 5, a sectional view taken along line 5—5 in FIG. 4, and FIG. 6, a section along line 6—6 in FIG. 4.

In a second preferred embodiment, the circuit substrate 4 is comprised of electroconductive patterns as first and second probes 7 and 8 are partially enclosed by short caps 9 and 10 comprising an electroconductive metallic material. Preferably, the electroconductive metallic material provides reflective faces for the two probes 7 and 8 that are fitted to the circuit substrate 4 by soldering or other joints. Further, within the case 2, the two waveguides 2a and 2b are preferably bent or inclined at a right angle relative to the short caps 9 and 10, respectively, and the tip of the first probe 7 extends into a hollow area surrounded by the first waveguide 2a and the short cap 9, while that of the second the probe 8 extends into a second hollow area surrounded by the second waveguide 2b and the short cap 10.

In the second embodiment of the invention, a horizontally polarized wave entered from the first propagation path 1a into the first waveguide 2a travels within the first waveguide 2a toward the circuit substrate 4 and is reflected by the short cap 9 toward the first probe 7 on the circuit substrate 4. Preferably, the horizontally polarized wave is detected by the first probe 7. On the other hand, a vertically polarized wave entering the second propagation path 1b into the second waveguide 2b travels within the second waveguide 2b toward the circuit substrate 4, and is reflected by the short cap 10 to the second probe 8 on the circuit substrate 4. Preferably, the vertically polarized wave is detected by the second probe 8.

Figure 7:
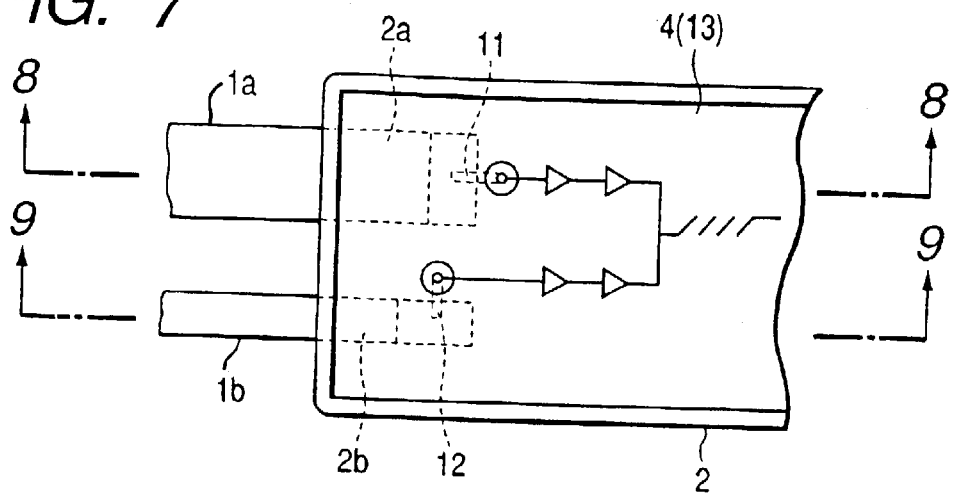
FIG. 7 shows a plan view of the essential part of a case provided in a third preferred embodiment of the invention.
Figure 8:
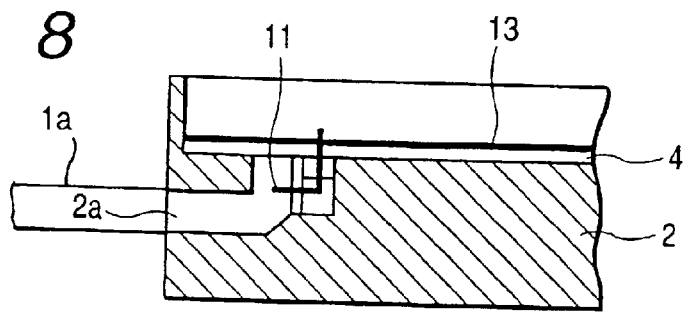
FIG. 8 shows a section view along line 8—8 in FIG. 7.
Figure 9:
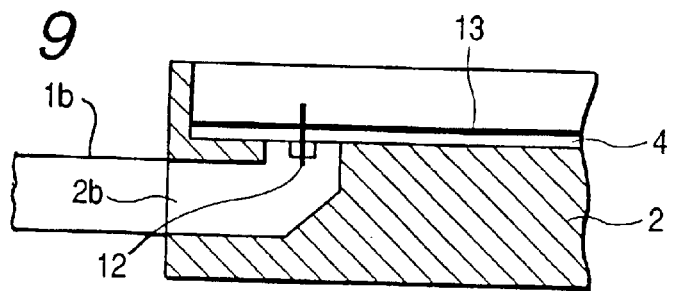
FIG. 9 shows a section view along line 9—9 in FIG. 7.

FIG. 7 shows a plan view of a case provided in a third preferred embodiment; FIG. 8 shows a sectional view taken along line 6—6 in FIG. 7, and FIG. 9 shows a sectional view taken along line 9—9 of FIG. 7.

This embodiment differs from the second embodiment described above in that L-shaped pin members are supported by the circuit substrate 4 as first and second probes 11 (shown in FIG. 7) and 12 (shown in FIGS. 7 and 9) and that a ground pattern 13 provided on the surface of the circuit substrate 4 is used as the reflective face for the two probes 11 and 12. Thus, within the case 2, the two waveguides 2a (shown in FIGS. 7 and 8) and 2b (shown in FIGS. 7 and 9) are bent at a right angle toward the circuit substrate 4, and the tip of the first probe 11 extends into the first waveguide 2a, while that of the second the probe 8 extends into the second waveguide 2b as shown in FIG. 7.

In a third embodiment, a horizontally polarized wave entered from the first propagation path 1a into the first waveguide 2a travels within the first waveguide 2a toward the circuit substrate 4 and is reflected by the ground pattern 13 toward the first probe 11 in the first waveguide 2a. Preferably, the horizontally polarized wave is detected by the first probe 11. On the other hand, a vertically polarized wave entered from the second propagation path 1b into the second waveguide 2b travels within the second waveguide 2b toward the circuit substrate 4, and is reflected by the ground pattern 13 toward the second probe 12 in the second waveguide 2b. Preferably, the vertically polarized wave is detected by the second probe 12.

Figure 10:
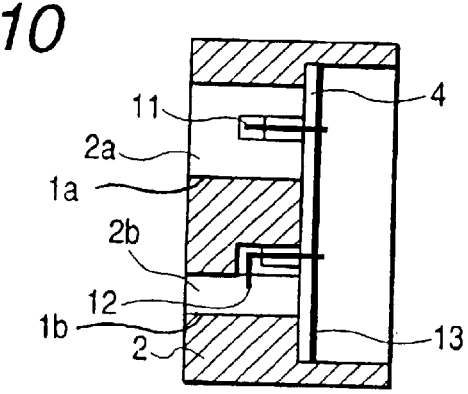
FIG. 10 shows a section view of the essential part of a case provided in a fourth preferred embodiment of the invention.

FIG. 10 shows a section view of the essential part of a case provided in a fourth preferred embodiment of the invention. This embodiment differs from the third embodiment described above in that both waveguides 2a and 2b are straight and that the circuit substrate 4 is arranged in an orthogonal direction to the axial centers of the waveguides 2a and 2b. Thus the tip of the first probe 11 consisting of an L-shaped pin member extends into inside the first waveguide 2a, while that of the second probe 12 also consisting of an L-shaped pin member extends into inside the second waveguide 2b, and the ground pattern is provided on the surface of the circuit substrate 4.

In the fourth preferred embodiment, a horizontally polarized wave entered from the first propagation path 1a into the first waveguide 2a proceeds straight in the first waveguide 2a and is reflected by the ground pattern 13 overlying a portion of the surface of the circuit substrate 4 toward the first probe 11 of the first waveguide 2a. Preferably, the horizontally polarized wave is detected by the first probe 11. On the other hand, a vertically polarized wave entered from the second propagation path 1b to the second waveguide 2b proceeds straight in the second waveguide 2b and is also reflected by the ground pattern 13 toward the second probe 12 in the second waveguide 2b. Preferably, the vertically polarized wave is detected by the second probe 12.

The present invention can be embodied in many other embodiments. For instance, in the fourth preferred embodiment shown in FIG. 10, the probes can be comprised of electroconductive patterns instead of pin members, or a short cap may be used instead of the ground pattern as the reflective face for the probes.

The presently preferred embodiments comprise a case having two waveguides in which linear polarized waves orthogonal to each other propagate, a circuit substrate fitted to this case and two probes disposed on this circuit substrate. Preferably, the two probes are arranged in the waveguides. In operation, as the mutually orthogonal linear polarized waves are coupled to their respective probes in the two waveguides of the case and the signals are detected by these probes, the signals can be amplified and synthesized on the same circuit substrate. Accordingly, signal losses and interference be reduced and the input structure of the waveguides can be simplified.

What is claimed is:

1. A converter for satellite communication reception, comprising:
    a horn configured to receive first and second linear polarized waves orthogonal to each other;
    a case having two waveguides configured to branch the first and second linear polarized waves, respectively, and to propagate the corresponding first and second linear polarized waves;
    a circuit substrate fitted to the case within a plane parallel to a direction that the first and second linear polarized waves propagate; and
    two probes disposed on the circuit substrate, wherein the two probes comprise pin members that are oriented orthogonal to each other within the corresponding waveguides;
    wherein the first and second linear polarized waves produce signals that can be received by the two probes on the circuit substrate; and
    wherein the two pin members each have an L shape, and wherein a ground pattern overlying the circuit substrate is configured as a reflective face for the pin members.

2. The converter for satellite communication reception according to claim 1, further comprising a mixer coupled to the circuit substrate.

3. The converter for satellite communication reception according to claim 1, further comprising a short cap coupled to the circuit substrate.

4. The converter for satellite communication reception according to claim 1, wherein:
    each of the two waveguides comprises a bending portion at which the corresponding linear polarized wave bends perpendicularly and propagates;
    the two probes comprise electroconductive patterns overlying the circuit substrate; and
    the electroconductive patterns are disposed between the respective bending portions and corresponding short caps, which serve as reflective faces, coupled to the circuit substrate.

* * * * *

UNITED STATES PATENT AND TRADEMARK OFFICE
CERTIFICATE OF CORRECTION

PATENT NO.       : 6,727,779 B2
APPLICATION NO.  : 10/038227
DATED            : April 27, 2004
INVENTOR(S)      : Dou Yuanzhu et al.

It is certified that error appears in the above-identified patent and that said Letters Patent is hereby corrected as shown below:

<u>On the Title Page</u>

In column 1, under item (56), "U.S. PATENT DOCUMENTS" insert the following:

--6,211,813    4/2001    Dousset et al.
  4,516,089    5/1985    Croscianski et al.--.

In column 2, under item (56), "FOREIGN PATENT DOCUMENTS" insert the following:

--EP           597,433    5/1994--.

Signed and Sealed this

Twelfth Day of May, 2009

JOHN DOLL
*Acting Director of the United States Patent and Trademark Office*